Jan. 3, 1928.
B. A. BOETTGER
EXTENSION CARRIER FOR TRUCK BODIES
Filed May 28, 1927　　2 Sheets-Sheet 1
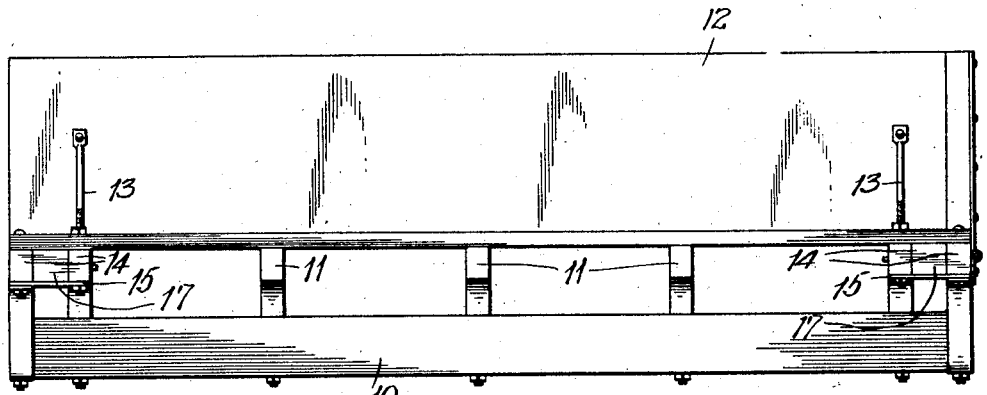
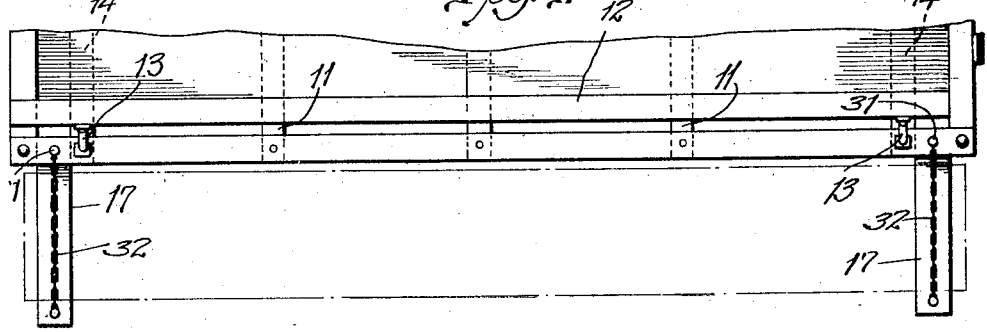
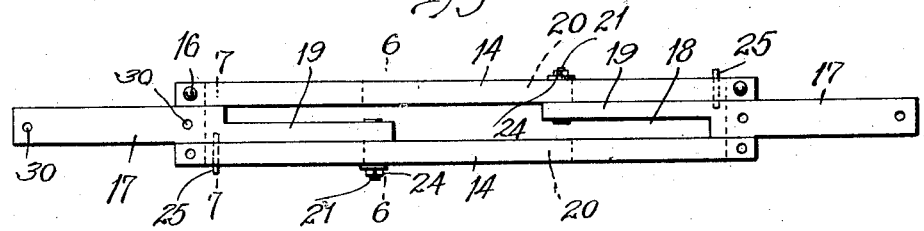
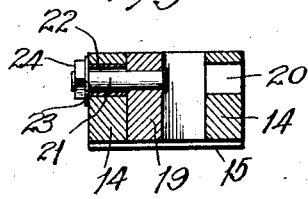
Inventor:
B. A. Boettger Jan. 3, 1928.　　　　　　　　　　　　　　　　　　　1,655,308
B. A. BOETTGER
EXTENSION CARRIER FOR TRUCK BODIES
Filed May 28, 1927　　　　　2 Sheets-Sheet 2
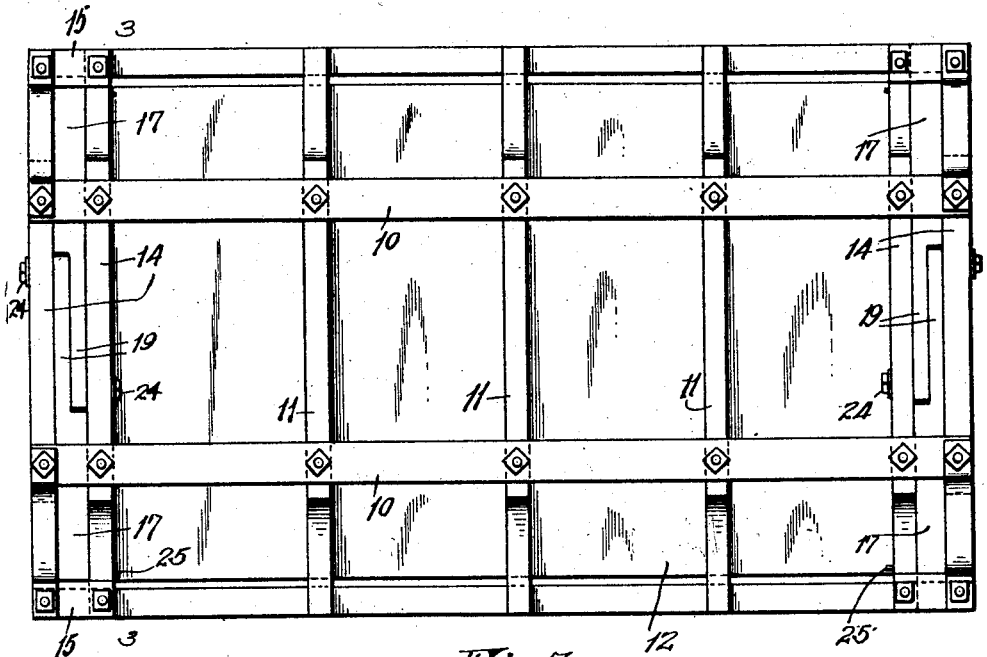
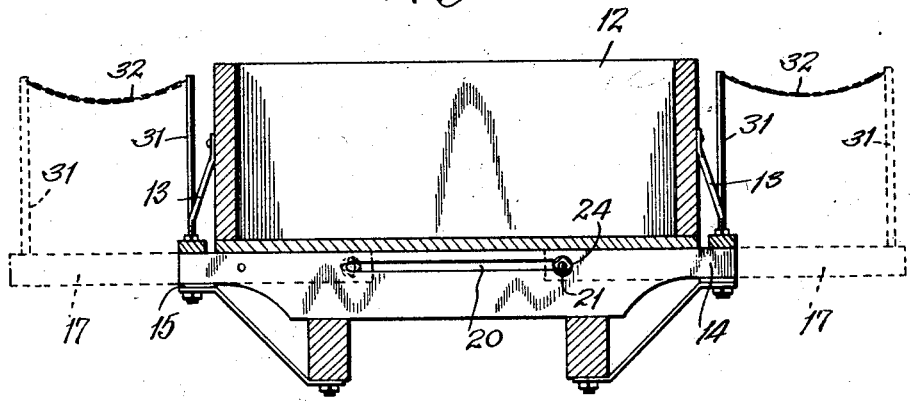
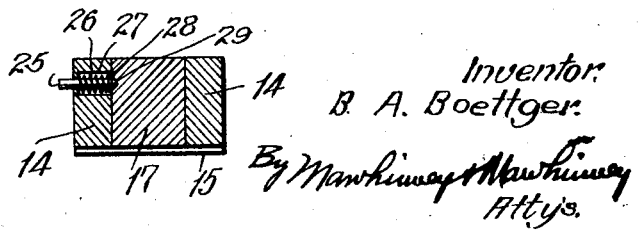
Inventor.
B. A. Boettger.

Patented Jan. 3, 1928.

1,655,303

UNITED STATES PATENT OFFICE.

BERNHARD A. BOETTGER, OF DENISON, IOWA.

EXTENSION CARRIER FOR TRUCK BODIES.

Application filed May 28, 1927. Serial No. 194,945.

The present invention relates to vehicles, and more particularly to an improved carrier or support for use as an auxiliary carrier for the vehicle.

An object of the present invention is to provide a vehicle frame or body with a plurality of supporting members which may be extended or collapsed, so that they may be quickly and easily brought into position for carrying additional load and which may be quickly moved out of the way when not in use, and so as to lie within the normal dimensions of the wagon or truck.

Another object of the invention is to provide a wagon box or body with extensible supports, which may be drawn out from the sides of the body to carry lumber, pipe, structural iron beams, or the like which can not be conveniently carried in the body, and means for releasably holding the supports in extended and contracted or folded position.

Another object of the invention is to provide auxiliary foldable supports of this character, which may be built into the body bolsters or into the frame structure of the wagon or truck, so that the bolster or frame structure may be utilized in part for holding the support in proper position and admit of its free adjustment.

A further object of the invention is to provide an extensible support for wagon bodies which may be constructed for application to trucks and wagons already in use, and without material modification of the same, the invention being capable of use as an attachment.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a wagon box or body mounted on the wagon frame and equipped with the extensible brackets of the present invention.

Figure 2 is a bottom plan view of the same.

Figure 3 is a transverse section taken substantially on the line 3—3 of Figure 2 and showing in full lines the extension bracket collapsed out of the way, and showing in dotted lines the extension brackets drawn out for use.

Figure 4 is a fragmentary top plan view of the wagon box showing one side thereof and with the brackets in extended position, the broken lines indicating a load supported on the brackets.

Figure 5 is a detail enlarged view of a pair of the extension brackets and the support therefor, the brackets being extended for use.

Figure 6 is a transverse section, enlarged, taken on the line 6—6 of Figure 5, and showing the guiding and stop means for the supports, and Figure 7 is an enlarged transverse section taken on the line 7—7 of Figure 5, and showing the releasable retaining bolt for holding the supports in extended and contracted positions.

Referring to the drawings, 10 designates a wagon frame shown in the present instance as comprising a pair of longitudinal sills or beams and across the upper edges of which are mounted spaced apart transversely disposed bolsters 11 upon which the wagon box 12 is directly mounted. The bolsters 11, in the usual manner, extend slightly beyond the opposite sides of the wagon box 12 and carry braces 13 which extend upwardly and inwardly to the sides of the wagon box 12 for securing the latter upon the bolsters 11. Any number of these braces 13 may be used the same being shown in the present instance as disposed only at the opposite corners of the wagon body.

While the invention is applicable to various types of wagons, the present illustration shows one type and wherein the auxiliary supports have a frame structure which comprises certain of the bolsters. These bolsters may be mounted upon the frame 10 beneath the wagon box 12 as supplemental to the usual bolsters 11, or, when built originally into the wagon structure, may comprise certain of the usual bolsters employed. In either case, the invention comprises a frame made up of a pair of bolsters 14 closely spaced apart by straps or end plates 15 secured by bolts 16 across the opposite ends of the bolsters 14 and extending across the lower edges of said ends, so that the space between the bolsters 14 is free and uninterrupted at opposite ends of the frame. The bolsters 14 thus provide a transverse guideway in the frame and in which are mounted a pair of extensible supports 17 slidable through the opposite ends of the frame and which are cut away or recessed as at 18 at their inner ends and in their opposite faces to provide tongues 19 adapted to overlap when the supports 17 are slid inwardly toward each other into the frame.

The bolsters 14 which comprise the support frame have longitudinal slots 20 which are disposed intermediate the ends of the bolts and through which project stop bolts 21 carried upon the inner ends of the tongues and projecting outwardly through the slots 20, sleeves or rollers 22 being mounted upon the shanks of the bolts 21 where they pass through the slots 20 to reduce frictional contact between the bolts and the bolsters 14. Washers 23 are mounted on the outer ends of the bolts 21 and are held against the outer sides of the bolsters 14 by nuts 24. The heads of the bolts 21 are relatively flat so that the bolts may pass each other during the collapsing of the supports 17.

Each bolster 14 is provided near one end with the locking bolt 25 and which carries a spring 26 seated in a socket 27 formed in the inner side of the bolster 14 and which engages a flange 28 near the inner end of the bolt 25 for normally urging the latter inwardly into engagement with the adjacent support 17. The support 17 is provided with notches 29 adapted to register with the inner end of the bolt 25 into various positions of adjustment of the support 17, so as to hold it firmly in adjusted position. The bolt 25 extends outwardly from its bolster 14 a distance sufficient to permit of the grasping of the bolt to withdraw it from the socket 29 when it is desired to slide the support 17 into extended or contracted position.

Each support 17 may be provided with spaced sockets 30 in its upper face adapted to receive the lower ends of stakes 31 adapted to be positioned in the support 17 and which are used in pairs with a chain 32 connecting the upper ends of the stakes to hold the latter from spreading under pressure of a load which is placed between the stakes.

The auxiliary carrier is adapted to be placed beneath the wagon box 12 with a carrier frame beneath each end portion of the wagon box, although any number of the devices may be used according to the length of the wagon box or body and according to the nature of the material to be carried.

In the present instance a carrier frame is mounted beneath each end of the wagon box as shown in Figures 1, 2 and 4. Normally the supports 17 are contracted or collapsed into the carrier frames and with the tongues 19 in overlapping position, as shown in Figure 2. The supports 17 are of such length that when collapsed they do not extend beyond the ends of the bolsters or carrier frame, and consequently do not increase the width of the wagon or truck structure. The supports 17 may, of course, be of any suitable length and preferably dependent upon the width of the wagon or truck, so as to comply with any traffic requirements as to lateral load extension or with other limitations relative to the character of the work and the structure of the vehicle.

It is obvious that various changes and modifications may be made in the details of construction and design of the above specifically described embodiment of this invention without departing from the spirit thereof, such changes and modifications being restricted only by the scope of the following claims.

What is claimed is:—

1. An auxiliary carrier for wagon boxes comprising spaced bolsters arranged in pairs beneath the opposite ends of the wagon box, supports slidably mounted between each pair of bolsters and slidable lengthwise thereof into position to project beyond the ends of the bolsters and the sides of the wagon box for receiving a load and adapted to be slid inwardly between the bolsters out of the way when not in use, means for guiding the supports in sliding movement, and means for releasably holding the supports in extended and contracted positions.

2. A bolster comprising separated fixed slotted members, supports slidable between and beyond said fixed members, and guide means on the supports projecting into and guided by the slotted portions of the fixed members.

3. A bolster comprising separated fixed members, supports slidable between and beyond said fixed members, and guide means for the supports.

4. A bolster comprising separated fixed members, supports slidable between and beyond said fixed members, and guide means on the supports moving in the members and acting to restrict the outward movement of the members.

5. A bolster comprising a hollow open-ended bolster body, supports slidable in and beyond the body and having offset overlapping parts and means to restrict the movement of the supports.

In testimony whereof I affix my signature.

BERNHARD A. BOETTGER.